(12) United States Patent
Pastrick et al.

(10) Patent No.: US 9,988,093 B2
(45) Date of Patent: Jun. 5, 2018

(54) EXOSKELETON VEHICLE UPPER BODY STRUCTURE

(71) Applicant: Ford Global Technologies, LLC, Dearborn, MI (US)

(72) Inventors: Richard Daniel Pastrick, Roseville, MI (US); Stephen William Gallagher, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/278,722

(22) Filed: Sep. 28, 2016

(65) Prior Publication Data

US 2018/0086386 A1 Mar. 29, 2018

(51) Int. Cl.
| | |
|---|---|
| *B60K 37/00* | (2006.01) |
| *B62D 23/00* | (2006.01) |
| *B62D 25/02* | (2006.01) |
| *B62D 25/06* | (2006.01) |
| *B62D 21/04* | (2006.01) |

(52) U.S. Cl.
CPC ........... *B62D 23/005* (2013.01); *B62D 21/04* (2013.01); *B62D 25/025* (2013.01); *B62D 25/06* (2013.01)

(58) Field of Classification Search
CPC ................ A61H 3/00; A61H 2201/165; A61H 2201/1642; A61H 2201/5007; A61H 2201/164; B25J 9/0006
USPC ........................................................ 296/205
See application file for complete search history.

(56) References Cited

U.S. PATENT DOCUMENTS

| | | | | |
|---|---|---|---|---|
| 2,256,885 A | * | 9/1941 | Bruss | B62D 21/02 280/797 |
| 3,073,647 A | * | 1/1963 | Beltz | B62D 25/025 296/204 |
| 3,162,478 A | * | 12/1964 | Richards | B62D 21/10 280/790 |
| 3,177,031 A | * | 4/1965 | Schilberg | B60G 99/002 280/790 |
| 3,455,595 A | * | 7/1969 | Eggert, Jr. | B60H 1/0055 296/208 |
| 4,917,435 A | | 4/1990 | Bonnett et al. | |
| 4,921,742 A | * | 5/1990 | Altus | B60N 3/046 428/101 |
| 5,219,439 A | * | 6/1993 | Moore | B62D 24/02 296/204 |
| 5,443,297 A | * | 8/1995 | Tanaka | B62D 25/02 296/203.03 |
| 5,549,349 A | * | 8/1996 | Corporon | B62D 21/157 296/187.12 |
| 6,470,990 B1 | | 10/2002 | Panoz | |
| 6,688,000 B2 | | 2/2004 | Wang et al. | |
| 6,824,204 B2 | * | 11/2004 | Gabbianelli | B62D 21/152 296/193.06 |
| 6,926,350 B2 | * | 8/2005 | Gabbianelli | B62D 21/11 296/187.11 |

(Continued)

*Primary Examiner* — Kiran B Patel
(74) *Attorney, Agent, or Firm* — Jason C. Rogers; Brooks Kushman P.C.

(57) ABSTRACT

A vehicle body exoskeleton includes a plurality of nodes each defining a receptacle. A plurality of tubes have first and second end portions smaller than and tapering inwardly from a main portion. Each end portion is received in one of the receptacles. An adhesive is applied to the end portions filling a gap defined between the receptacles and the end portions to bond the tubes to the receptacles.

9 Claims, 4 Drawing Sheets

(56) References Cited

U.S. PATENT DOCUMENTS

| | | | | |
|---|---|---|---|---|
| 7,216,926 | B2* | 5/2007 | Hampel | B62D 29/043 296/102 |
| 7,547,063 | B2 | 6/2009 | Stojkovic et al. | |
| 7,574,801 | B2 | 8/2009 | Lowe et al. | |
| 8,371,642 | B2 | 2/2013 | Baccouche et al. | |
| 8,414,068 | B1* | 4/2013 | Na | B62D 27/023 296/178 |
| 8,657,368 | B2 | 2/2014 | Freeman et al. | |
| 8,939,497 | B2* | 1/2015 | Baudart | B62D 25/147 296/193.02 |
| 2001/0019216 | A1* | 9/2001 | Kobayashi | B62D 21/157 296/204 |
| 2001/0028179 | A1* | 10/2001 | Takemoto | B60N 2/012 296/204 |
| 2001/0050497 | A1* | 12/2001 | Jaekel | B62D 23/005 296/205 |
| 2006/0059807 | A1* | 3/2006 | Zimmerman | B62D 23/005 52/239 |
| 2012/0119546 | A1* | 5/2012 | Honda | B62D 25/025 296/203.01 |
| 2012/0161472 | A1* | 6/2012 | Rawlinson | B60K 1/04 296/187.08 |
| 2013/0049391 | A1* | 2/2013 | Kurogi | B62D 25/025 296/30 |
| 2013/0088045 | A1* | 4/2013 | Charbonneau | B62D 21/157 296/187.12 |
| 2015/0375806 | A1* | 12/2015 | Gallagher | B62D 33/077 296/35.1 |
| 2016/0311382 | A1* | 10/2016 | Murasawa | B60N 3/042 |
| 2017/0210426 | A1* | 7/2017 | Gao | B62D 21/157 |
| 2017/0210427 | A1* | 7/2017 | Akhlaque-e-rasul | B62D 27/026 |

\* cited by examiner

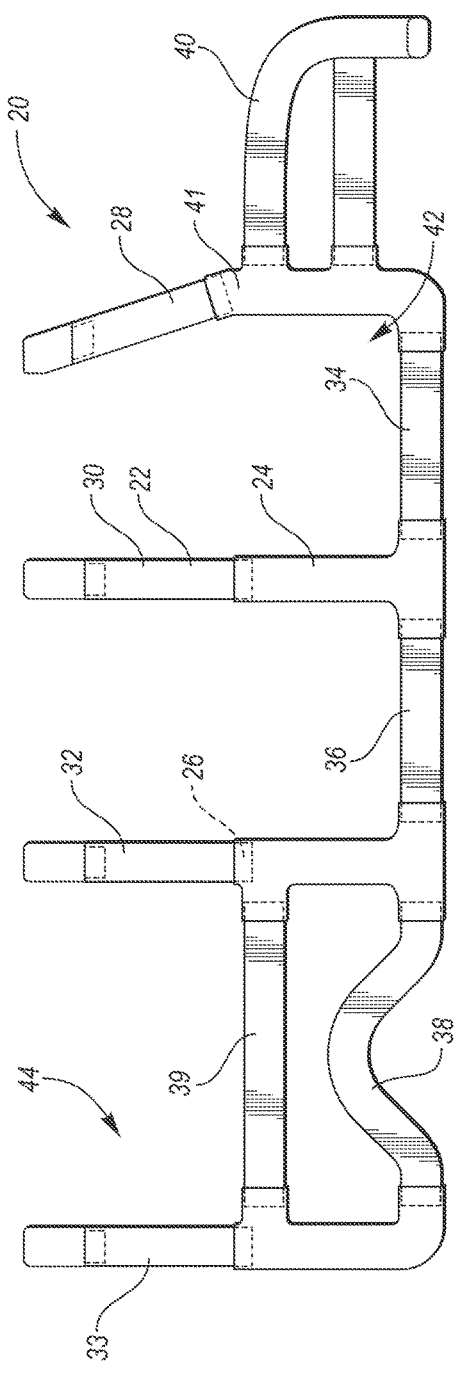
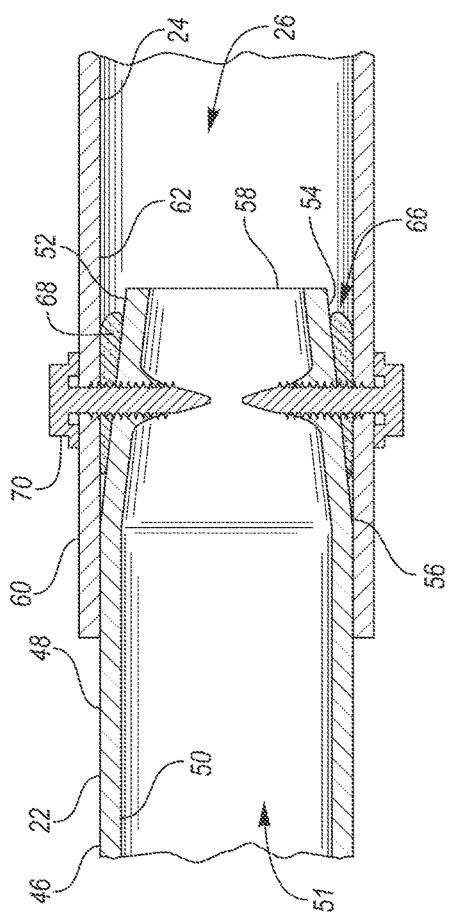
FIG. 1
FIG. 2

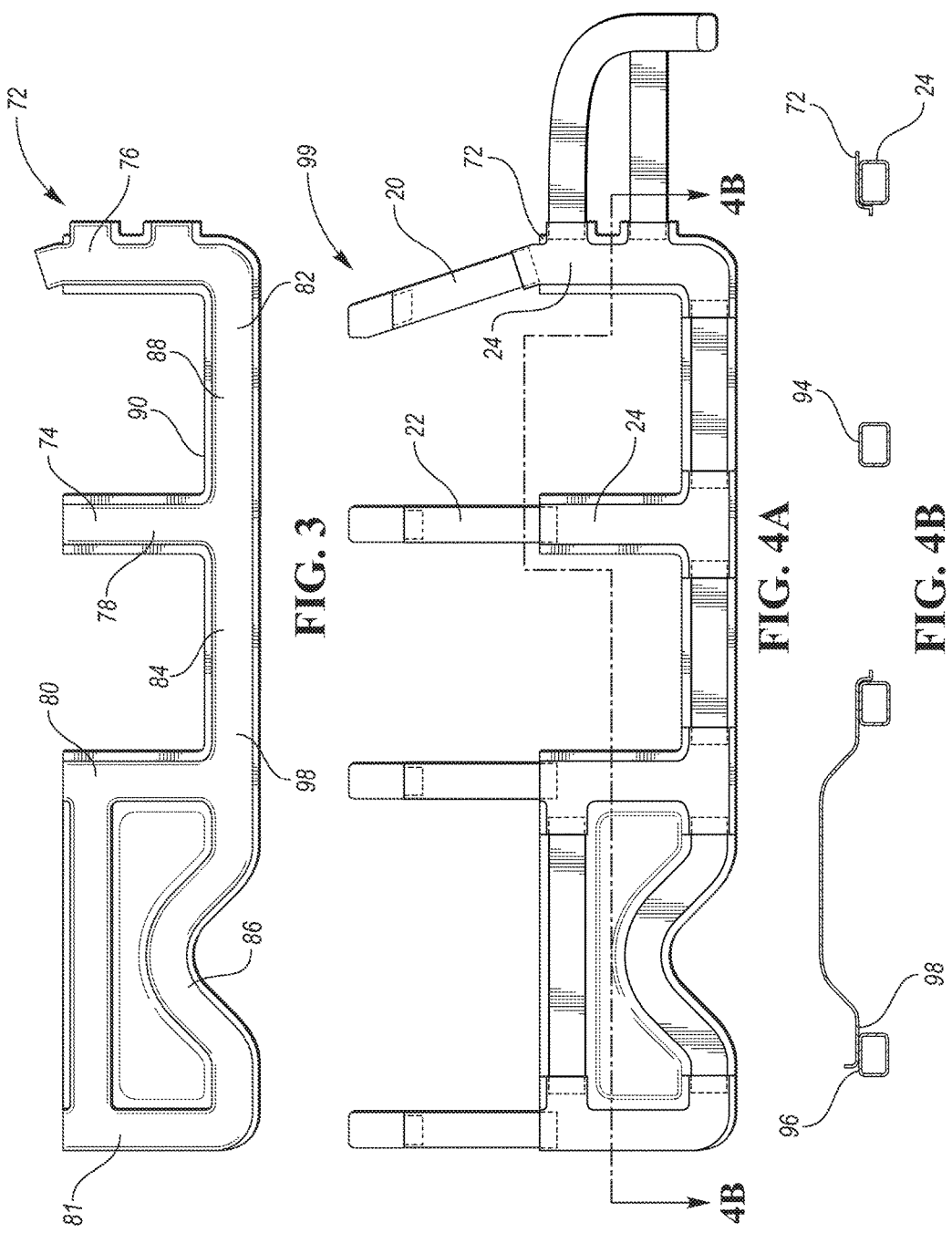

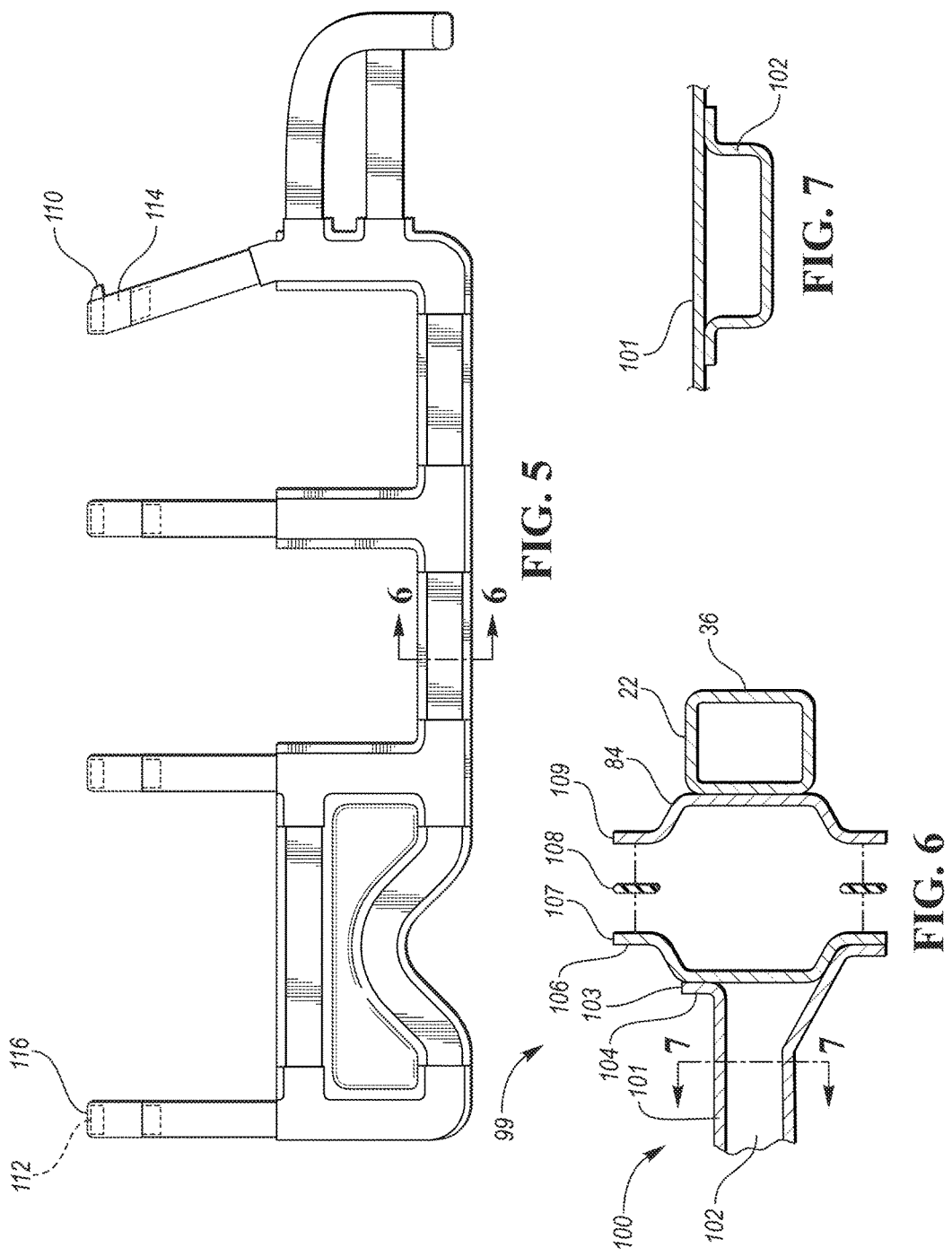

EXOSKELETON VEHICLE UPPER BODY STRUCTURE

TECHNICAL FIELD

The present disclosure relates to a method of making an exoskeleton body structure for a vehicle.

BACKGROUND

Body-on-frame vehicles have a body structure supported by a frame. The frame may include a pair of longitudinally extending beams or an integral uni-body frame. Suspension components connect to the frame to support the frame above the ground. The underbody of the body structure is bolted to the frame at select locations. Body mounts are disposed between the body structure and the frame to absorb vibrations. The body structure is formed by welding together multiple sheet-metal stampings that are initially assembled as subassemblies and subsequently assembled together to form a body-in-white structure.

Forming body structures with multi-layer stampings is a complex and time consuming process. The stampings used in this process are product specific and are generally not usable across multiple product lines. This disclosure describes a process of forming a body-in-white vehicle that reduces weight and complexity of the body-in-white vehicle and minimizes dies, stamped parts, labor, tool footprint, and investment, as will be described in detail below.

SUMMARY

According to one embodiment, a vehicle body exoskeleton includes a plurality of nodes each defining a receptacle. A plurality of tubes have first and second end portions smaller than and tapering inwardly from a main portion. Each end portion is received in one of the receptacles. An adhesive is applied to the end portions filling a gap defined between the receptacles and the end portions to bond the tubes to the receptacles.

In some embodiments, the tubes and nodes are joined together by a one-sided fastener. The one-sided fastener may be a flow-drill screw or a blind rivet. The one-sided fastener secures the joint until the adhesive cures. The nodes may be metal casting and the tubes may be metal extrusions. The node and the tubes may have a same cross-sectional shape. In other embodiments, the nodes may include projections that are received in receptacles defined by the tubes.

According to another embodiment, a vehicle body structure includes a floor pan and left and right inner side-sill plates connected to opposing sides of the floor pan. Left and right outer side-sill plates each include an inboard side connected to the left and right inner side-sill plates, respectively. Left and right exoskeletons each include tubular members assembled to cast nodes. The exoskeletons are assembled to an outboard side of the left and right outer side-sill plates, respectively.

In some embodiments, each of the tubular members may further include a main portion and a tapered portion. The tubular members are disposed within the nodes with the main portion abutting an inner wall of the node and with the tapered portion spaced apart from the inner wall to define a gap. Adhesive is disposed in the gap to bond the node and the tubular member. One or more one-sided fasteners may extend through each of the tapered portions and the cast nodes to secure the joint until the adhesive cures. The one-sided fastener may be a flow-drill screw.

The vehicle body structure may further include a roof assembly having a longitudinally extending spine and a lateral support connected to the spine and extending transversely between the exoskeletons. The lateral support may have a first end portion disposed in one of the cast nodes of the first exoskeleton and a second end disposed in one of the cast nodes of the second exoskeleton.

The vehicle body structure may also include a windshield header having a first end portion connected to one of the cast nodes of the exoskeleton and a second end portion connected to one of the cast nodes of the second exoskeleton. The headers and nodes may be connected with a tapered glove joint.

According to yet another embodiment, a method of manufacturing a vehicle body is presented. The method includes connecting an inner side-sill panel to a longitudinal side of a floor-pan assembly. The method further includes assembling an exoskeleton including nodes each defining a receptacle and elongate members each having a tapered tip disposed in one of the receptacles and defining a gap between the receptacles and the tapered tips with adhesive applied in the gap. The method also includes connecting an outer side-sill panel to the exoskeleton to form an exoskeleton subassembly, and connecting the outer side-sill panel to the inner side-sill panel to attach the exoskeleton subassembly to the floor-pan assembly.

The method may further include connecting an outer body panel to the exoskeleton to form a class-A surface of the vehicle. The method may also include attaching a windshield header to one of the nodes and attaching a rear header to another of the nodes. In some embodiments the method further includes connecting a roof spine to at least one lateral roof support to form a spine assembly, connecting the lateral roof support to one of the nodes, and connecting the to the spine to the rear header or the windshield header.

According to a further embodiment, a method includes assembling an inner side sill to a floor pan, and assembling a body side inner subassembly including an outer side sill. The method further includes assembling an exoskeleton, and connecting the body side inner subassembly to the exoskeleton to form a longitudinal side assembly. The method also includes connecting the outer side sill to the inner side sill to connect the longitudinal side assembly to the floor pan.

BRIEF DESCRIPTION OF THE DRAWINGS

FIG. 1 is a side elevation view of a left exoskeleton of a vehicle body structure.

FIG. 2 is a cross-sectional view of a joint between an elongate member and a node of the exoskeleton.

FIG. 3 is a side elevation view of a right body side inner assembly.

FIG. 4A is a side elevation view of a right longitudinal side assembly.

FIG. 4B is a partial top cross-sectional view of the right longitudinal side assembly taken along line 4B-4B.

FIG. 5 is an elevation view of a partial body-in-white vehicle.

FIG. 6 is a cross-sectional view of the floor-pan assembly, the side sill, and the exoskeleton taken along line 6-6.

FIG. 7 is a cross-sectional view of the floor-pan assembly taken along line 6-6.

DETAILED DESCRIPTION

Figure 8:
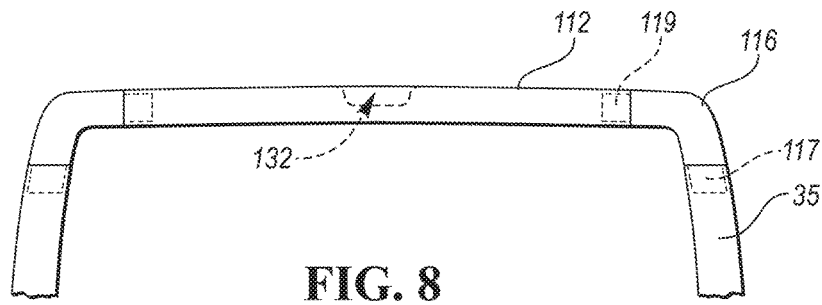
FIG. 8 is a back view of the rear header attached between the D-Pillars.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Traditional vehicle body structures are formed of sheet-metal stampings welded together to form the structure. This method may be costly and time-consuming. To increase manufacturing efficiencies, this disclosure presents a method of manufacturing an exoskeleton formed of elongate members and nodes that are insertable into each other and secured together by a combination of fasteners and adhesive.

The vehicle body structure may be formed of subassemblies including: a floor-pan assembly, a pair of longitudinal side assemblies, and a roof assembly. The vehicle body structure may be assembled by first assembling each of the longitudinal side assemblies, and then assembling the side assemblies to the floor-pan assembly. Lastly, the roof assembly is assembled to the side assemblies. This process will be described in more detail below with reference to the figures.

Referring to FIG. 1, the manufacturing process begins by assembling the exoskeletons 20, which are each a subassembly of one of the longitudinal side assemblies. The exoskeletons 20 include of a plurality of elongate members 22 and nodes 24 that are assembled together to form the exoskeleton. The elongate members 22 may be tubular having a hollow center. The elongate members may be extrusions, roll formed tubes or bars that may be steel, aluminum alloy, other metal alloy, or composite. The elongate members 22 may be hydroformed, roll formed, or drawn in a press into desired shapes. The nodes 24 may be metal castings (such as steel or aluminum alloy) that include one or more receptacles 26 that receive a portion of one or more elongate members 22. The elongate members may also define receptacles that receive a portion of the node.

Once assembled, the elongate members 22 and the nodes 24 cooperate to form, for example, the A-pillars 28, the B-pillars 30, the C-pillars 32, and the D-pillars 33. The lower portions of the A-pillar 28 and the B-pillar 30 are interconnected by a lower rail 34. The B-pillar 30 and the C-pillar 32 are interconnected by a lower rail 36. The C-pillar 32 and the D-pillars 33 are interconnected by a lower rail 38 and an upper rail 39. A pair of shotgun tubes 40 are connected to the node 41 of the A-pillar 28. The pillars and the lower rails cooperate to define door openings 42, and the C-pillar, the D-pillar, and the upper rail 39 define a rear window opening 44. The exoskeleton 20 may also be used on a two-door vehicle, in which case, the B-pillar and the second door opening are eliminated.

Referring to FIG. 2, the elongate members 22 and the nodes 24 may be interconnected by a tapered glove joint. Each of the elongate members 22 includes a main portion 46 having an outer side 48, also known as an outer diameter (OD), and an inner side 50, also known as an inner diameter (ID), that defines a hollow interior 51. A tapered end portion 52 has a proximal end 56 connected to the main portion 46 and a distal end 58 that forms a tip of the elongate member 22. The tapered portion 52 may be frustoconical, if the elongate member 22 is circular, having a slanted surface 54. In other embodiments, the elongate member 22 has a rectangular cross section and the tapered end includes multiple slanted surfaces. The node 24 has an outer surface 60 and an inner surface 62 that defines the receptacle 26. The elongate member 22 is attached to the node 24 by inserting one of the tapered ends 52 into the receptacle 26. When inserted, the OD 48 engages the inner surface 62, and the slanted surface 54 and the inner surface 62 cooperate to define a gap 66. Adhesive 68 is disposed in the gap 66 to secure the elongate member 22 to the node 24. One or more fasteners 70 are connected to the elongate member 22 and the node 24 to secure the assembly before the adhesive cures. The adhesive may be heat-activated and cure when heated during the painting. The fastener 70 is a one-sided fastener, which only requires assess to the outer surface of the joint to be installed. One-sided fasteners 70 include flow drill screws, blind rivets, or the like.

Referring to FIG. 3, a body side inner assembly 72 connects each of the exoskeletons 20 to one of the longitudinal side of the floor-pan assembly. The assembly 72 may be formed of multiple sheet-metal stampings 74 that are first welded together to form the assembly 72 and subsequently attached to an inside surface of one of the exoskeletons 20 by welds, fasteners, adhesives, or a combination thereof. Each of the sheet-metal stampings 74 may correspond to a component of the exoskeleton 20. For example, the assembly 72 may include an A-pillar stamping 76, a B-pillar stamping 78, a C-pillar stamping 80, a D-pillar stamping 81, and outer side-sill stampings 82, 84, and 86. Each of the stampings may include a main portion 88 connecting with the exoskeleton 20 and one or more flanges 90 (commonly referred to as AB flanges).

FIGS. 4A and 4B illustrate the right (i.e., passenger side) body side inner assembly 72 connected to the right exoskeleton 20. The stampings 74 have an outboard side 98 disposed against the inboard side 94 of one or more of the elongate members 22 or the inboard side 96 of one or more of the nodes 24. The outboard side 98 and the inboard sides 94 or 96 may be connected by welds, fasteners, adhesives, or a combination thereof. The assembly 72 provides structure for the passenger cabin and provides a simple and effective method for attaching the exoskeletons 20 to the floor-pan assembly.

Longitudinal side subassemblies 99 are complete after the left and right assemblies 72 are connected to the left and right exoskeletons 20, respectively. The two longitudinal side subassemblies 99, the front and rear headers, and the floor-pan assembly are then fixtured in the framer of the pre-clamp line.

Referring to FIGS. 5, 6 and 7, the floor-pan assembly 100 includes a floor pan 101 and a transverse beam 102 that extends across the vehicle between the left and right longitudinal sides 103 of the floor pan 101. The floor pan 101 has a flange is 104 attached to one of the inner side-sill plates 106. The side-sill plates 106 each includes flanges 107 attached to the flanges 109 on the outer side-sill plates 82, 84, and 86 that connect the side subassembly 99 to the floor-pan assembly 100. The outer side-sill plates 82, 84, 86 are attached to the inner side-sill plates 106 with adhesive 108. One or more fasteners (not shown) may connect the plates prior to curing of the adhesive. In some embodiments, the flanges 107 and 109 may be welded together. The right-side longitudinal side subassembly is connected to the right longitudinal side of the floor-pan assembly 100 in a similar manner. After the side subassemblies 99 are connected to the floor-pan assembly 100, the windshield header 110 is attached to the upper A-pillar nodes 114, and the rear header 112 is attached to the upper D-pillar nodes 116. The headers may be attached to the nodes using a tapered glove joint. The bulk head and dash panel may also be installed during this step of the manufacturing process.

Referring to FIG. 8, the rear header 112 is attached between a pair of D-pillar nodes 116. Each of the nodes 116 may include a first projection 117 received in the D-pillar tube 35, and a second projection 119 extending inboard. The rear header 112 may be an upside-down U-channel section with an open cavity. In other embodiments, the header 112 is a closed section with cutouts defined in the bottom sidewall at the ends. The cutouts allow the header to be received on the projections 119 from the top. The rear header 112 is connected to the nodes 116 by placing the open cavity on top of the projections 119. This allows the header to be installed from the top of the vehicle. Top installation is preferable because the longitudinal side subassemblies 99 are assembled to the floor-pan assembly 100 before assembly of the headers. The windshield header 110 may be assembled in a similar manner.

Figure 9:
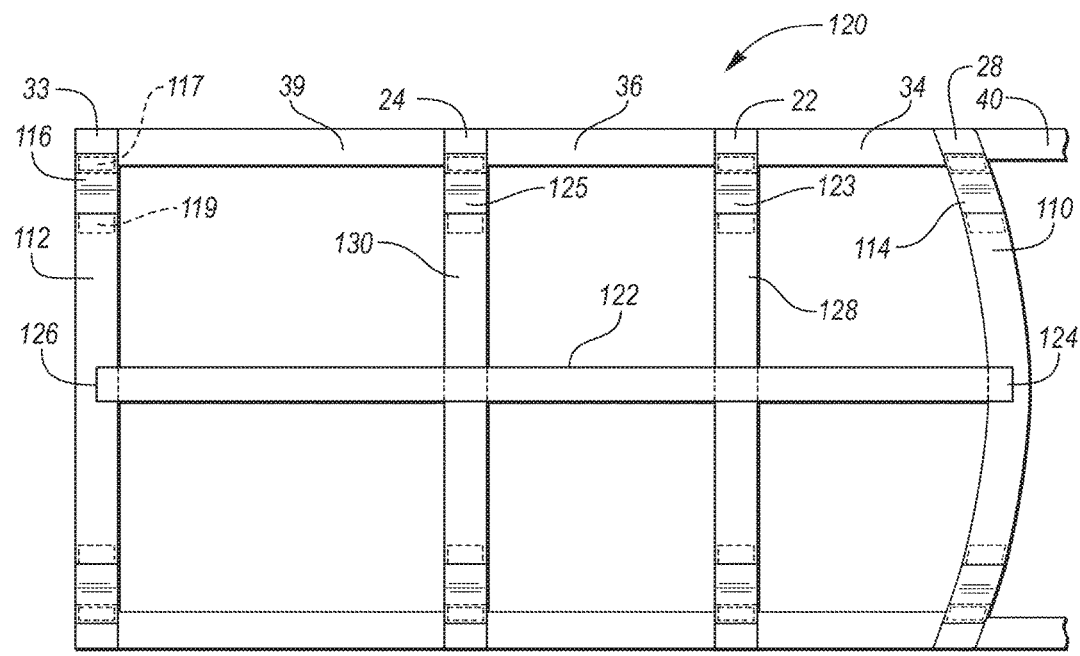
FIG. 9 is a top view of a portion of the body-in-white vehicle.

Referring to FIGS. 8 and 9, a roof assembly (also known a spine assembly) 120 includes a longitudinal spine 122 that extends along all or a portion of the roof. The spine 122 may be located on the longitudinal centerline of the vehicle. The spine 122 has a forward end 124 connected to the windshield header 110 and a rear end 126 connected to the rear header 112. In some embodiments, the spine 122 may only be connected to one of the headers. The rear header 112 defines a pocket 132 recessed into a top of the rear header. The rear end 126 of the spine is seated in the pocket 132 with the spine 122 and the rear header 112 flush with each other along the top surface of the header and spine. The windshield header 110 may define a similar pocket that receives the forward end 124. Lateral supports 128 and 130 extend transversely between the B-pillar nodes 123 and the C-pillar nodes 125, respectively, to laterally support the body structure. The B-pillar nodes 123 and the C-pillar nodes 125 may be the same or similar to the D-pillar nodes 116. The spine 122 is attached to a top side of each of the lateral supports. The lateral supports 128, 130 may define pockets that receive a portion of the spine. In an alternative embodiment, the lateral supports may not extend completely across the vehicle. Instead, lateral supports may extend from a respective pillar to the spine.

The roof assembly 120 may be attached to the exoskeletons 20 after the side subassemblies 99 are connected to the floor-pan assembly 100. As such, the roof assembly 120 is installed on the exoskeletons 20 from the top because the lateral width of the exoskeletons is fixed once installed onto the floor pan. The roof assembly 120 may be assembled to the vehicle by first attaching the lateral supports 128, 130 to the spine 122 to form a complete subassembly, and then attaching the lateral supports 128 and 130 to their respective nodes, and the spine to one or both of the headers.

Figure 10:
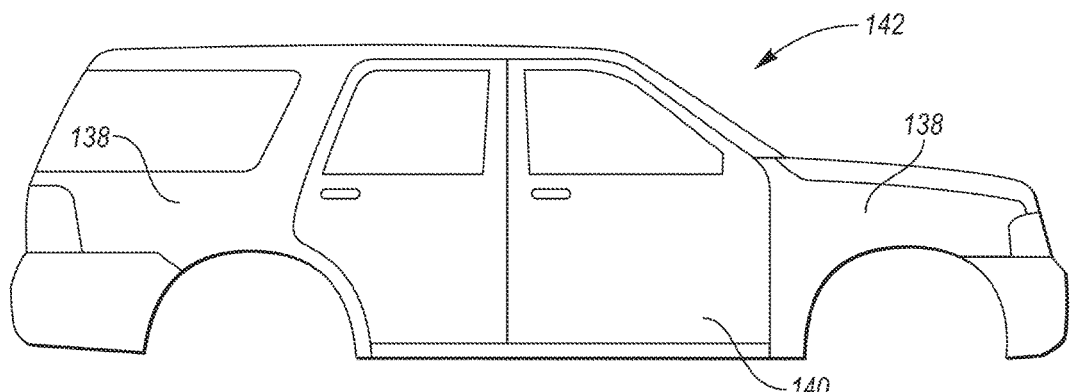
FIG. 10 is an elevation view of the body-in-white vehicle with the doors assembled to the vehicle.

Referring to FIG. 10, after the roof assembly is assembled to the headers and pillars, the outer panels 138 and doors 140 are installed forming a complete body-in-white upper body structure 142. The outer panels 138 are attached to the exoskeleton 20, the inner body assembly 72, or both. Some of the outer panels 138 include A/B flanges attached to the A/B flanges 90 of the inner body assembly 72. Once fully assembled, the body-in-white structure 142 is then, electro-coated, painted, and heated in one or more ovens. The adhesive is activated by the heat and cures in the oven. The body-in-white structure is installed on the chassis after it is assembled and painted. The frame rails of the chassis may be mounted to one or more of the transverse beams 102 of the floor-pan assembly 100.

While described in the context of body-on-frame vehicle construction, the teachings of this disclosure are also applicable to uni-body vehicle construction. It is not intended that these illustrated example embodiments disclosed above describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle body structure comprising:
    a floor pan;
    left and right inner side-sill plates connected to opposing sides of the floor pan;
    left and right outer side-sill plates including an inboard side connected to the left and right inner side-sill plates, respectively; and
    left and right exoskeletons each including tubular members assembled to cast nodes, wherein the exoskeletons are assembled to an outboard side of the left and right outer side-sill plates, respectively.

2. The vehicle body structure of claim 1, wherein each of the tubular members further includes a main portion and a tapered portion, and the tubular members are disposed within the nodes with the main portion abutting an inner wall of the node and with the tapered portion spaced apart from the inner wall to define a gap, and wherein adhesive is disposed in the gap to bond the node and the tubular member.

3. The vehicle body structure of claim 2 further comprising a one-sided fastener extending through one of the tapered portions and one of the nodes.

4. The vehicle body structure of claim 3, wherein the one-sided fastener is a flow-drill screw.

5. The vehicle body structure of claim 1 further comprising a roof assembly including a longitudinally extending spine and a lateral support connected to the spine and extending transversely between the exoskeletons, wherein the lateral support has a first end portion disposed in one of the cast nodes of the left exoskeleton and has a second end disposed in one of the cast nodes of the right exoskeleton.

6. The vehicle body structure of claim 4 further comprising a windshield header including a first end portion connected to one of the cast nodes of the exoskeleton and a second end portion connected to one of the cast nodes of the second exoskeleton.

7. The vehicle body structure of claim 6, wherein the first and second end portions of the windshield header each define a receptacle that receives a portion of corresponding one of the nodes.

8. The vehicle body structure of claim 1 further comprising an outer body panel connected to the exoskeleton.

9. The vehicle body structure of claim 1 further comprising a pillar inner panel connected to the outer side-sill panel and to the exoskeleton.

* * * * *